United States Patent
Ramirez et al.

(10) Patent No.: US 12,168,530 B2
(45) Date of Patent: Dec. 17, 2024

(54) THERMAL CONTROL SYSTEMS AND METHODS FOR SPACECRAFT

(71) Applicant: Lockheed Martin Corporation, Bethesda, MD (US)

(72) Inventors: Mark Ramirez, Gilroy, CA (US); Donna Hooker, East Greenwich, RI (US); Olivia Christine Chen, San Jose, CA (US); Megan Taylor Isabelle, San Francisco, CA (US); David Wayne Knapp, Morgan Hill, CA (US); Meredith Swegan Nevius, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 8 days.

(21) Appl. No.: 18/176,219

(22) Filed: Feb. 28, 2023

(65) Prior Publication Data
US 2024/0286768 A1    Aug. 29, 2024

(51) Int. Cl.
  *B64G 1/58* (2006.01)
  *B64G 1/54* (2006.01)
(52) U.S. Cl.
  CPC ............... *B64G 1/58* (2013.01); *B64G 1/546* (2013.01)
(58) Field of Classification Search
  CPC .................................. B64G 1/58; B64G 1/546
  See application file for complete search history.

(56) References Cited

U.S. PATENT DOCUMENTS

| | | | |
|---|---|---|---|
| 4,755,422 A * | 7/1988 | Headrick | H05K 5/0213 442/7 |
| 6,391,400 B1 | 5/2002 | Russell et al. | |
| 9,828,116 B1 * | 11/2017 | Mena | B64G 1/503 |
| 10,583,940 B2 | 3/2020 | Wallinger | |
| 11,261,335 B1 | 3/2022 | Hasegawa et al. | |
| 11,262,489 B1 | 3/2022 | Hasegawa et al. | |
| 2017/0297750 A1 * | 10/2017 | Liu | B64G 1/503 |
| 2019/0152626 A1 | 5/2019 | Babilo | |

FOREIGN PATENT DOCUMENTS

| | | | | |
|---|---|---|---|---|
| CN | 114667254 A * | 6/2022 | | B60R 13/0869 |
| EP | 0780921 A2 | 6/1997 | | |

OTHER PUBLICATIONS

Bledt et al. (Year: 2013).*
European Patent Office, Extended European Search Report issued in EP Application No. 24159092.6-1004, mailed Aug. 1, 2024.
Deposition Sciences Inc.: "Sunshade Thermal Control Material", Dec. 3, 2023 (Dec. 3, 2023), Retrieved from the Internet: URL:https://www.depsci.com/products-app/sunshade-thermal-control-material/#:-:text=PRODUCT%20OVERVIEW,in%20LEO%2C%20MEO%20and%20 GEO. [retrieved on Jul. 8, 2024].

* cited by examiner

*Primary Examiner* — Valentina Xavier
(74) *Attorney, Agent, or Firm* — Baker Botts L.L.P.

(57) ABSTRACT

According to some embodiments, a spacecraft includes an electronics housing having a sun-facing side. The spacecraft further includes a peel-and-stick thermal control material coupled to the sun-facing side of the electronics housing. The peel-and-stick thermal control material includes a non-metallic optical interface coating, a carrier film, and an adhesive.

20 Claims, 2 Drawing Sheets

THERMAL CONTROL SYSTEMS AND METHODS FOR SPACECRAFT

TECHNICAL FIELD

This disclosure generally relates to spacecraft, and more specifically to thermal control systems and methods for spacecraft.

BACKGROUND

Spacecraft such as satellites contain delicate instruments and electronics that must be protected from solar radiation. In addition, the instruments and electronics of spacecraft generate heat that must be radiated away from the spacecraft. To reflect incoming solar radiation while simultaneously radiating internally-generated heat, most satellites utilize optical solar reflectors (OSRs). OSRs are generally formed using metals and are typically expensive and time-consuming to install on spacecraft.

SUMMARY OF THE DISCLOSURE

According to some embodiments, a spacecraft includes an electronics housing having a sun-facing side. The spacecraft further includes a peel-and-stick thermal control material coupled to the sun-facing side of the electronics housing. The peel-and-stick thermal control material includes a non-metallic optical interface coating, a carrier film, and an adhesive.

According to other embodiments, a spacecraft includes a sun-facing side. The spacecraft further includes a thermal control material coupled to the sun-facing side of the spacecraft. The thermal control material includes a non-metallic optical interface coating, a carrier film, and an adhesive.

According to other embodiments, a method includes identifying a sun-facing side of a spacecraft. The method further includes applying a thermal control material to the sun-facing side of the spacecraft. The thermal control material includes a non-metallic optical interface coating, a carrier film, and an adhesive.

Technical advantages of certain embodiments may include providing improved systems and methods for reflecting incoming solar radiation and radiating internally-generated heat of spacecraft. Instead of utilizing typical OSRs that are difficult and time-consuming to install, the thermal control material of the disclosed embodiments can be easily installed by simply removing a liner to expose an adhesive and then applying the thermal control material to sun-facing sides of a spacecraft. Furthermore, because the disclosed thermal control material is non-metallic and is therefore lighter than existing OSRs, a beneficial weight-savings for spacecraft can be achieved. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION OF THE DISCLOSURE

Spacecraft such as satellites contain delicate instruments and electronics that must be protected from solar radiation. In addition, the instruments and electronics of spacecraft generate heat that must be radiated away from the spacecraft. To reflect incoming solar radiation while simultaneously radiating internally-generated heat, most satellites utilize optical solar reflectors (OSRs). OSRs are generally formed using metals and are typically expensive and time-consuming to install on spacecraft.

To address these and other problems with typical OSRs used on spacecraft, the present disclosure provides systems and methods for reflecting incoming solar radiation and radiating internally-generated heat of spacecraft. Instead of utilizing typical OSRs that are difficult and time-consuming to install, the thermal control material of the disclosed embodiments can be easily installed by simply removing a liner to expose an adhesive and then applying the thermal control material to sun-facing sides of a spacecraft. Furthermore, because the disclosed thermal control material is non-metallic and is therefore lighter than existing OSRs, a beneficial weight-savings for spacecraft can be achieved.

To facilitate a better understanding of the present disclosure, the following examples of certain embodiments are given. In no way should the following examples be read to limit or define the scope of the disclosure. Embodiments of the present disclosure and its advantages may be best understood by referring to the included FIGURES, where like numbers are used to indicate like and corresponding parts.

Figure 1:
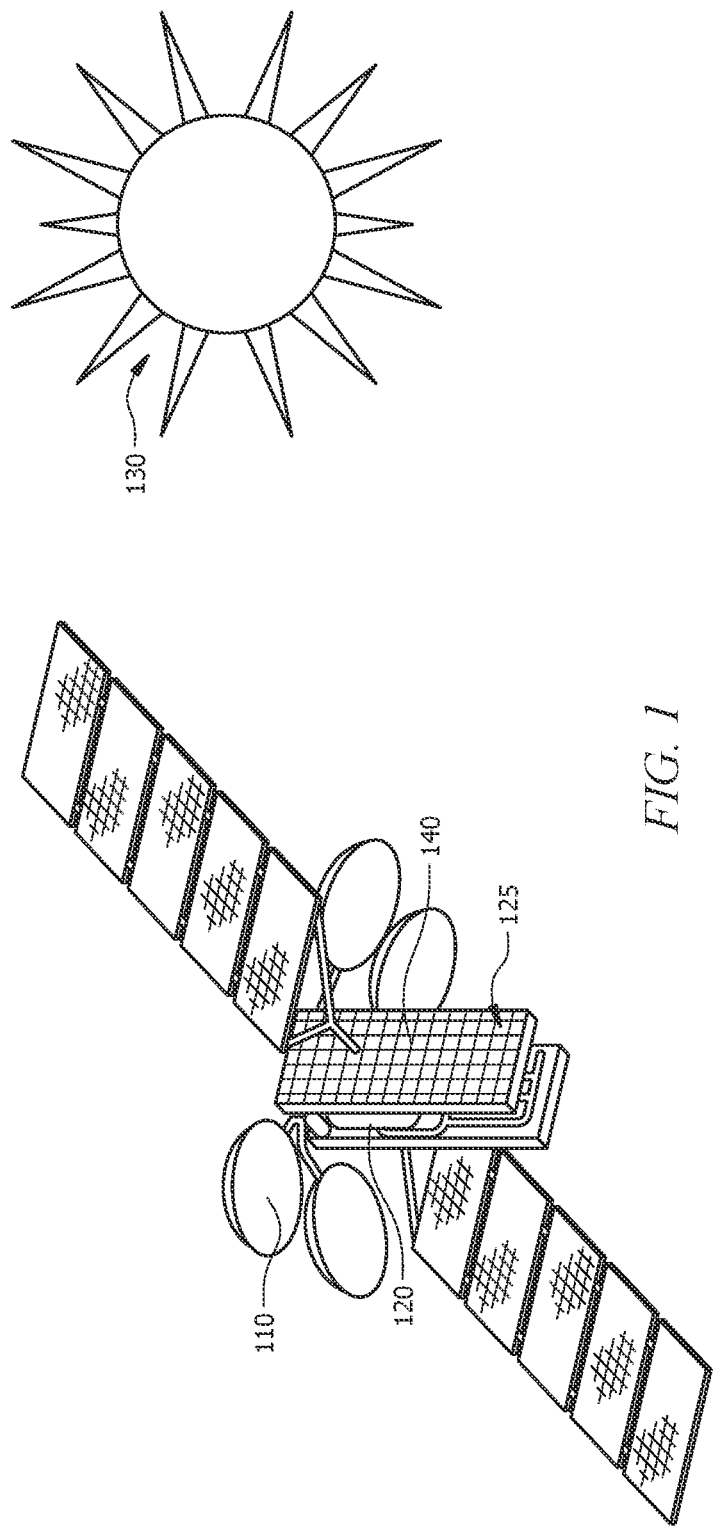
FIG. 1 illustrates a spacecraft with a thermal control material, according to some embodiments.

FIG. 1 illustrates a spacecraft 110 with a thermal control material 140, according to some embodiments. Spacecraft 110 includes an electronics housing 120, a sun-facing side 125, and thermal control material 140. Thermal control material 140 may be applied to sun-facing side 125 or any other portion of spacecraft 110.

In general, thermal control material 140 is a material that may be easily and quickly applied to spacecraft 110 in order to provide improved reflection of incoming solar radiation and improved radiation of internally-generated heat of spacecraft 110. Thermal control material 140 can be easily and quickly installed by simply removing a liner to expose an adhesive and then applying the thermal control material 140 to spacecraft (e.g., sun-facing side 125). Because thermal control material 140 is non-metallic and is therefore lighter than existing OSRs, a beneficial weight-savings for spacecraft can be achieved.

Spacecraft 110 is any appropriate vehicle or object that is designed to operate in space. In some embodiments, spacecraft 110 is a satellite. In other embodiments, spacecraft 110 is a space vehicle such as a manned or unmanned space capsule. In some embodiments, spacecraft 110 operates in low earth orbit (LEO), medium earth orbit (MEO), or geostationary earth orbit (GEO).

Electronics housing 120 is any portion of spacecraft 110 that houses electronics such as sensors and instrumentation of spacecraft 110. Electronics housing 120 may be any appropriate size and may be in any appropriate location on spacecraft 110. In general, the contents of electronics housing 120 need to be protected from radiation from the sun 130. In addition, heat generated by the contents of electronics housing 120 needs to be dissipated from spacecraft 110. In some embodiments, electronics housing 120 includes a sun-facing side 125. In general, sun-facing side 125 is a side of spacecraft 110 that is exposed to radiation from the sun 130. Sun-facing side 125 may be exposed to radiation from the sun 130 during some or all of the time that spacecraft 110 is in orbit.

Thermal control material 140 is a material that is applied to any portion of spacecraft 110 in order to provide reflection of incoming solar radiation from the sun 130 and to provide dissipation of internally-generated heat of spacecraft 110 (e.g., heat generated from components within electronics housing 120). In some embodiments, thermal control material 140 is flexible, conformable, and is radio-frequency (RF) transmissive. In some embodiments, thermal control material 140 is applied to sun-facing side 125, but the disclosure is not limited to such applications. In some embodiments, thermal control material 140 includes SUN-SHADE from Deposition Sciences, Inc. A specific embodiment of thermal control material 140 is discussed in more detail below with respect to FIG. 2.

Figure 2:
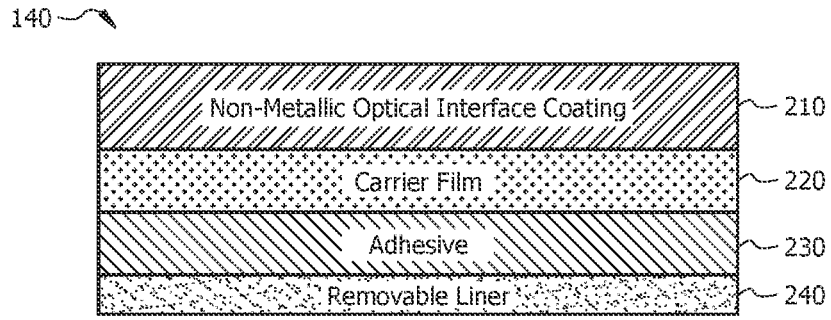
FIG. 2 illustrates a thermal control material that may be utilized by the spacecraft of FIG. 1, according to some embodiments.

FIG. 2 illustrates a thermal control material 140 that may be utilized by the spacecraft 110 of FIG. 1, according to some embodiments. In this embodiment, thermal control material 140 includes a non-metallic optical interface coating 210, a carrier film 220, an adhesive 230, and a removable liner 240. Non-metallic optical interface coating 210 is coupled to one side of carrier film 220, and adhesive 230 is coupled to the opposite side of carrier film 220. Adhesive 230 is coupled to the opposite side of carrier film 220 from non-metallic optical interface coating 210. Removable liner 240 covers adhesive 230 until thermal control material 140 is ready to be applied to spacecraft 110.

Non-metallic optical interface coating 210 in general is a multi-layer dielectric thin-film stack. Unlike OSRs, non-metallic optical interface coating 210 does not contain metals, but is highly reflective. In some embodiments, non-metallic optical interface coating 210 is formed from inorganic materials in place of metals.

Non-metallic optical interface coating 210 is coupled to carrier film 220, which may be KAPTON film. In turn, carrier film 220 contains adhesive 230 on an opposite side of carrier film 220 from non-metallic optical interface coating 210. In some embodiments, adhesive 230 is a pressure-sensitive adhesive. Adhesive 230 is covered by removable liner 240 until thermal control material 140 is ready to be applied to spacecraft 110.

In general, thermal control material 140 is lightweight and easy to apply to spacecraft 110. In some embodiments, thermal control material 140 has area factor of ~45 $ft^2/lb$. Thermal control material 140 is flexible and conformable and may be cut, perforated, folded, and stitched. Thermal control material 140 is RF transmissive and has low RF attenuation from below about 1 GHz through about 69 GHz. Thermal control material 140 is suitable for use in L, S, C, X, Ku, K, Ka, and V bands.

In some embodiments, thermal control material 140 is tuned for Air Mass Zero (AM0) solar irradiation. In some embodiments, thermal control material 140 has a solar reflectivity (for 250-2500 nm) that is greater than or equal to 82% and a solar transmissivity of less than or equal to 2%. In other embodiments, thermal control material 140 has a solar reflectivity (for 250-2500 nm) that is greater than or equal to 60% and a solar transmissivity of less than or equal to 3%. In some embodiments, thermal control material 140 has a hemispherical 300K emissivity of greater than or equal to 0.71. In other embodiments, thermal control material 140 has a hemispherical 300K emissivity of greater than or equal to 0.40

Figure 3:
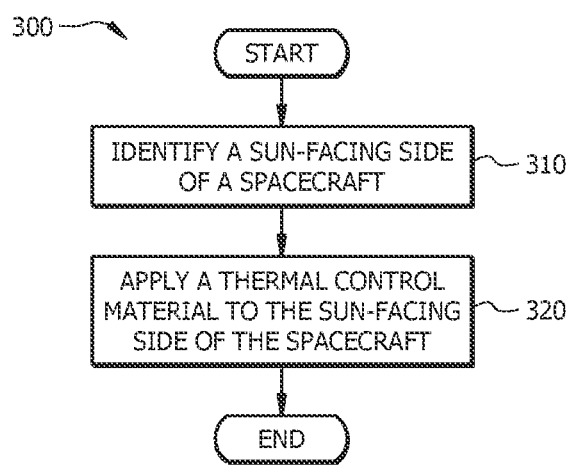
FIG. 3 illustrates a method of providing thermal control of a spacecraft, according to some embodiments.

FIG. 3 is a flow diagram illustrating an example method 300 of providing thermal control of a spacecraft. Method 300 may begin in step 310 where a sun-facing side of a spacecraft is identified. In some embodiments, the sun-facing side of the spacecraft is sun-facing side 125. In some embodiments, the sun-facing side of the spacecraft is a portion of an electronics enclosure such as electronics housing 120.

At step 320, a thermal control material is applied to the sun-facing side of the spacecraft. In some embodiments, the thermal control material includes a non-metallic optical interface coating, a carrier film, and an adhesive. In some embodiments, the thermal control material is thermal control material 140. In some embodiments, the non-metallic optical interface coating is non-metallic optical interface coating 210 and may be SUNSHADE from Deposition Sciences, Inc. In some embodiments, the non-metallic optical interface coating includes a multi-layer dielectric thin-film stack and is devoid of metals. In some embodiments, the carrier film is carrier film 220 and may be KAPTON film. In some embodiments, the adhesive is adhesive 230 and is a pressure-sensitive adhesive. After step 320, method 300 may end.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A spacecraft comprising:
an electronics housing comprising a sun-facing side; and
a peel-and-stick thermal control material coupled to the sun-facing side of the electronics housing, the peel-and-stick thermal control material having an area factor of about 45 ft2/lb and comprising:
a non-metallic optical interface coating having a solar reflectivity for light of wavelength of 250-2500 nm that is greater than or equal to 82% and a solar transmissivity of less than or equal to 2%;
a carrier film; and
an adhesive.

2. The spacecraft of claim 1, wherein the peel-and-stick thermal control material has a hemispherical 300K emissivity of greater than or equal to 0.71.

3. The spacecraft of claim 1, wherein the carrier film comprises a polyimide film.

4. The spacecraft of claim 1, wherein the non-metallic optical interface coating comprises a multi-layer dielectric thin-film stack.

5. The spacecraft of claim 1, wherein the adhesive is a pressure-sensitive adhesive.

6. The spacecraft of claim 1, wherein the peel-and-stick thermal control material is flexible and conformable.

7. The spacecraft of claim 1, wherein the peel-and-stick thermal control material is radio-frequency (RF) transmissive for L, S, C, X, Ku, K, Ka, and V bands.

8. A spacecraft comprising:
a sun-facing side; and
a thermal control material coupled to the sun-facing side of the spacecraft, the thermal control material having an area factor of about 45 ft2/lb and comprising:
a non-metallic optical interface coating having a solar reflectivity for light of wavelength of 250-2500 nm that is greater than or equal to 82% and a solar transmissivity of less than or equal to 2%;
a carrier film; and
an adhesive.

9. The spacecraft of claim 8, wherein the thermal control material has a hemispherical 300K emissivity of greater than or equal to 0.71.

10. The spacecraft of claim 8, wherein the carrier film comprises a polyimide film.

11. The spacecraft of claim 8, wherein the non-metallic optical interface coating comprises a multi-layer dielectric thin-film stack.

12. The spacecraft of claim 8, wherein the adhesive is a pressure-sensitive adhesive.

13. The spacecraft of claim 8, wherein the thermal control material is flexible and conformable.

14. The spacecraft of claim 8, wherein the thermal control material is radio-frequency (RF) transmissive for L, S, C, X, Ku, K, Ka, and V bands.

15. A method comprising:
identifying a sun-facing side of a spacecraft; and
applying a thermal control material to the sun-facing side of the spacecraft, the thermal control material having an area factor of about 45 ft2/lb and comprising:
a non-metallic optical interface coating having a solar reflectivity for light of wavelength of 250-2500 nm that is greater than or equal to 82% and a solar transmissivity of less than or equal to 2%;
a carrier film; and
an adhesive.

16. The method of claim 15, wherein the thermal control material comprises has a hemispherical 300K emissivity of greater than or equal to 0.71.

17. The method of claim 15, wherein the carrier film comprises a polyimide film.

18. The method of claim 15, wherein the non-metallic optical interface coating comprises a multi-layer dielectric thin-film stack.

19. The method of claim 15, wherein the adhesive is a pressure-sensitive adhesive.

20. The method of claim 15, wherein the thermal control material is flexible, conformable, and radio-frequency (RF) transmissive for L, S, C, X, Ku, K, Ka, and V bands.

* * * * *